June 8, 1943.  W. E. BROEDLING  2,321,064
FLEXIBLE TUBING
Filed Dec. 5, 1940

INVENTOR
William E. Broedling
BY
his ATTORNEYS

Patented June 8, 1943

2,321,064

UNITED STATES PATENT OFFICE 2,321,064

FLEXIBLE TUBING

William E. Broedling, Dayton, Ohio, assignor to General Motors Corporation, Detroit, Mich., a corporation of Delaware Application December 5, 1940, Serial No. 368,564

1 Claim. (Cl. 138—56)

This invention relates to tube construction and is particularly concerned with the construction of tubes of the reenforced flexible type.

An object of the invention is to provide an inexpensive, durable, highly flexible tube of the type used for the conveyance of air and the like which has a substantially continuous internal lining and which includes a reenforcing spiral of wire between the plies of tubing.

Another object of the invention is to provide a tube which comprises two layers of fabric which are skim-coated with rubber and which are disposed on either side of a wire spiral, said fabric layers being vulcanized together between the coils of wire for making the tube substantially unitary.

Further objects and advantages of the present invention will be apparent from the following description, reference being had to the accompanying drawing wherein preferred embodiments of the present invention are clearly shown.

One type of flexible tubing, apparatus and method for making same is clearly disclosed in copending application, Serial No. 247,344 assigned to the assignee of the present invention. This invention is an improvement on the type of tubing disclosed in said application and is particularly directed to tubing which has a substantially smooth continuous internal structure, thus markedly reducing friction to fluid flow through the tube. The tubing disclosed in this application may be made by a method and apparatus similar to that disclosed in the aforementioned application or it may be fabricated on other types of apparatus or by other well known methods.

Figure 1:
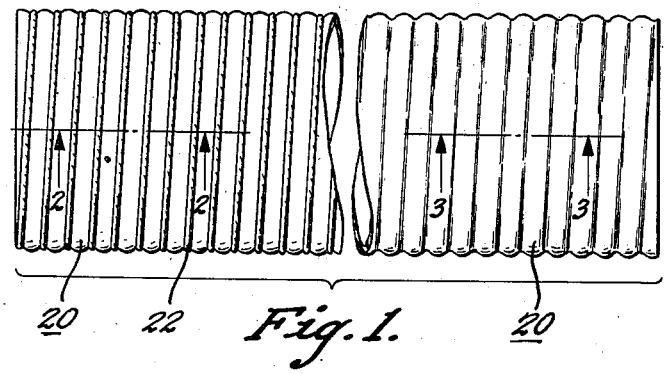
Fig. 1 shows a section of tubing made in accordance with the invention described herein, the portion on the left of the figure depicting tubing with a cord wrapped on the outside thereof, whereas the portion on the right of the figure shows the same tubing without the cord.
Figure 6:
Fig. 6 is an enlarged, sectional view of the fabric layer showing the skim coating of the uncured rubber thereon.

Fig. 1 shows tubing 20 which includes a cord wrapping 22 thereon as disclosed on the left-hand portion of the figure; whereas Fig. 1 at the right hand portion thereof discloses the same tubing with the cord 22 removed. In manufacturing the tubing a layer of fabric 24 which is skim coated with uncured rubber, as noted at 25 in Fig. 6, is preferably spirally wrapped around a mandrel 27 and overlapped at the joint thereof to form a continuous covering thereon. A spiral wire 26 is applied to the rubber coated side of the fabric 24. After the wire 26 is applied, another layer of fabric 28 is spirally wrapped thereover and overlapped upon itself, said fabric 28 being similar to the fabric 24 and having a skim coating of rubber thereon which during the wrapping is faced downwardly against the wire. Thus the fabric layers 24 and 28 each skim coated with rubber which is uncured enclose the spiral wire 26, each of the skim coated sides of the fabric layers are directed toward one another. Next, a cord 22 is wrapped tightly about the built up tubing and is wound therearound so as to be interposed between the helical turns of wire 26. In this manner the fabric outer layer 28 is drawn tightly toward the mandrel so that its skim-coated rubber surface presses against the skim-coated rubber surface of fabric 24. The entire assembly is next vulcanized so that the two fabric layers are united at their contact surfaces. It will be noted that the spiral wire is not tightly enclosed between the fabric layers but is permitted to move a substantial distance longitudinally within the tube thereby increasing the flexibility of the tubing.

Figures 2, 3:
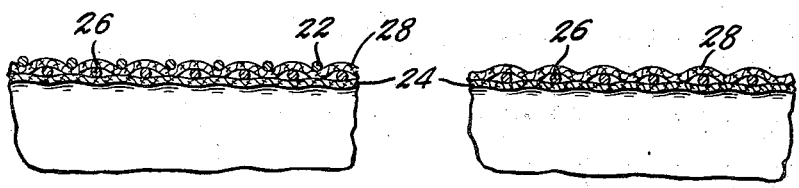
Fig. 2 is an enlarged, sectional view taken on the line 2—2 of Fig. 1.
Fig. 3 is an enlarged sectional view taken on the line 3—3 of Fig. 1.
Figure 5:
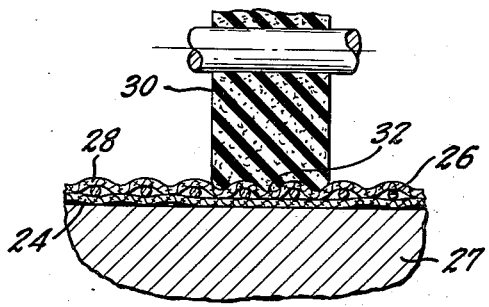
Fig. 5 is an enlarged view taken on the line 5—5 of Fig. 4.
Figure 4:
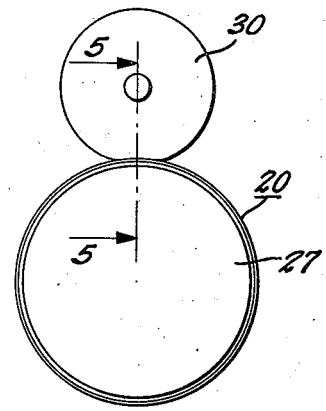
Fig. 4 is a diagrammatic view showing apparatus for causing the layers of fabric to be forced together, such modification being used when the cord is not used.

After vulcanization the cord may be removed as shown in Fig. 1 on the right-hand side thereof or in Fig. 3. Another means of vulcanizing the two fabric layers together is shown in Figs. 4 and 5 wherein a roller 30 is provided which has annular portions 32 thereon spaced to fit between the spiral windings of the wire. In this case the roller is pressed against the mandrel through the tubing as the tubing advances and either the tubing or the roller may be rotated so that the outer fabric layer is forced into association with the inner fabric layer since the skim coated rubber layers thereon are much the same in consistency as friction tape. The two layers adhere together and may then be vulcanized to cause permanent adherence.

An example of tubing as herein described may be made from 4 ounce muslin approximately .010" thick with skim coated rubber on one side only. The muslin is in strip form about 4" wide.

In making a tube 2.5" in diameter the fabric is wrapped preferably about a 2.5" mandrel with a lap of ¼", thus providing a lead or pitch of approximately 4.5". The reenforcing member consists of a hard drawn steel wire .041" in diameter which is wrapped spirally around the fabric layer with a pitch of approximately ⅜". The outer layer of rubber coated fabric is the same as that used on the inner layer and is wrapped with the same lead as the inner layer said outer layer being wrapped over the spiral winding of the wire. A cord is next wrapped around the outside of the tube with the same ⅜" pitch as used for the wire but is interposed between turns of the wire. The tube after formation is cured in open steam on the mandrel after which vulcanizing treatment the mandrel is removed as well as the cord if desired.

It is possible to bend a tube made in this manner to an angle of 180° without in any way damaging the tubing, such great flexibility being impossible when the wire reenforcement is tightly held between the inner and outer layers, in other words, when the rubber completely surrounds the wire and is vulcanized thereto.

It is apparent that the fabric coated with rubber may be wrapped in the same direction or in opposite directions as is desired and it is also possible without departing from the spirit of the invention to make tubing wherein the two fabric layers are made from sheet material wrapped around the mandrel to provide only a longitudinal seam thereon. However, it has been found from experience that the spiral form herein described is preferable.

Also, it is possible to utilize rubber strips instead of fabric coated with rubber, if the occasion so demands. However, it has been found that the use of rubber coated fabric reduces expense and also increases the durability of the tubing. Similarly fabric may be skim-coated with rubber on both sides thereof under certain conditions of use.

While the embodiments of the present invention as herein disclosed, constitute preferred forms, it is to be understood that other forms might be adopted, all coming within the scope of the claim which follows.

What is claimed is as follows:

Manually-bendable light weight tubing for conducting low pressure warm air and the like with a minimum of skin friction, comprising: an inner tube of thin flexible fabric having a substantially smooth cylindrical internal surface, a wire helix of loose pitch coaxially disposed around said smooth inner tube, an outer tube of thin flexible fabric disposed around said helix-bound inner tube and having a helical radially inwardly-extending rib of correspondingly loose pitch formed therein and cemented to the external surface of said substantially-smooth inner tube to define therewith a wide helical channel within which said wire helix is loosely disposed permitting substantial axial displacements of its individual turns relative to each other enabling facile bending of the tubing without material localized buckling of said inner tube.

WILLIAM E. BROEDLING.